(12) United States Patent
Huggins et al.

(10) Patent No.: US 8,205,825 B2
(45) Date of Patent: Jun. 26, 2012

(54) ENGINE PYLON MADE FROM COMPOSITE MATERIAL

(75) Inventors: George Larimore Huggins, Wichita, KS (US); Randall Ray West, Wichita, KS (US); Richard Todd Briscoe, Benton, KS (US); John Michael Welch, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 983 days.

(21) Appl. No.: 12/185,551

(22) Filed: Aug. 4, 2008

(65) Prior Publication Data

US 2009/0212155 A1    Aug. 27, 2009

Related U.S. Application Data

(60) Provisional application No. 61/031,883, filed on Feb. 27, 2008.

(51) Int. Cl.
*B64D 27/00* (2006.01)
(52) U.S. Cl. .......................................... 244/54; 248/554
(58) Field of Classification Search .................... 244/54, 244/55; 248/554–557; 60/796, 797
See application file for complete search history.

(56) References Cited

U.S. PATENT DOCUMENTS

| 4,725,019 | A | * | 2/1988 | White | 244/54 |
|---|---|---|---|---|---|
| 5,239,822 | A |  | 8/1993 | Buchacher |  |
| 5,467,941 | A |  | 11/1995 | Chee |  |
| 5,746,391 | A |  | 5/1998 | Rodgers et al. |  |
| 6,095,456 | A | * | 8/2000 | Powell | 244/54 |
| 6,113,030 | A | * | 9/2000 | Law et al. | 244/54 |
| 6,131,850 | A |  | 10/2000 | Hey et al. |  |
| 6,138,949 | A |  | 10/2000 | Manende et al. |  |
| 6,398,161 | B1 | * | 6/2002 | Jule et al. | 244/54 |
| 7,083,143 | B2 |  | 8/2006 | Whitmer et al. |  |
| 7,104,306 | B2 |  | 9/2006 | Huggins et al. |  |
| 7,159,819 | B2 | * | 1/2007 | Machado et al. | 244/54 |
| 7,296,768 | B2 | * | 11/2007 | Machado et al. | 244/54 |
| 7,740,200 | B2 | * | 6/2010 | Diochon et al. | 244/54 |
| 2005/0116093 | A1 | * | 6/2005 | Machado et al. | 244/54 |
| 2005/0178889 | A1 | * | 8/2005 | Machado et al. | 244/54 |

(Continued)

FOREIGN PATENT DOCUMENTS

WO    WO 2007036516 A1 *    4/2007

OTHER PUBLICATIONS

Zivko Aeronautics, Inc.; Company Brochure 2004; Advanced Composites Aerospace Engineering Aircraft Design Systems Integration; p. 5.

*Primary Examiner* — Tien Dinh
*Assistant Examiner* — Joseph W Sanderson
(74) *Attorney, Agent, or Firm* — Hovey Williams LLP

(57) ABSTRACT

A load-bearing structure, such as a pylon or strut, having a monolithic tubular-shaped first central structure composed of composite material and a plurality of metal fittings for supporting an engine on an airframe structure of an aircraft, such as a wing. Most of the fittings are integrated into the load-bearing structure through bonding. The metal fittings carry the high bearing loads that are transmitted into the pylon at the engine-pylon and wing-pylon interfaces. The load-bearing structure may also include a second central structure of a tubular shape composed of composite material and integrated with one end portion of the first central structure by bonding and/or mechanical fasteners.

24 Claims, 12 Drawing Sheets

U.S. PATENT DOCUMENTS

| | | |
|---|---|---|
| 2007/0069069 A1 | 3/2007 | Diochon et al. |
| 2007/0205324 A1 | 9/2007 | Diochon et al. |
| 2008/0191088 A1* | 8/2008 | Diochon et al. ............ 244/54 |
| 2008/0217502 A1* | 9/2008 | Lafont ............ 248/554 |
| 2008/0237394 A1* | 10/2008 | Combes et al. ............ 244/54 |
| 2008/0251634 A1* | 10/2008 | Bernardi et al. ............ 244/54 |
| 2008/0315033 A1* | 12/2008 | Diochon et al. ............ 244/54 |
| 2009/0108127 A1* | 4/2009 | Cazals ............ 244/54 |
| 2009/0294579 A1* | 12/2009 | Eve et al. ............ 244/54 |

* cited by examiner

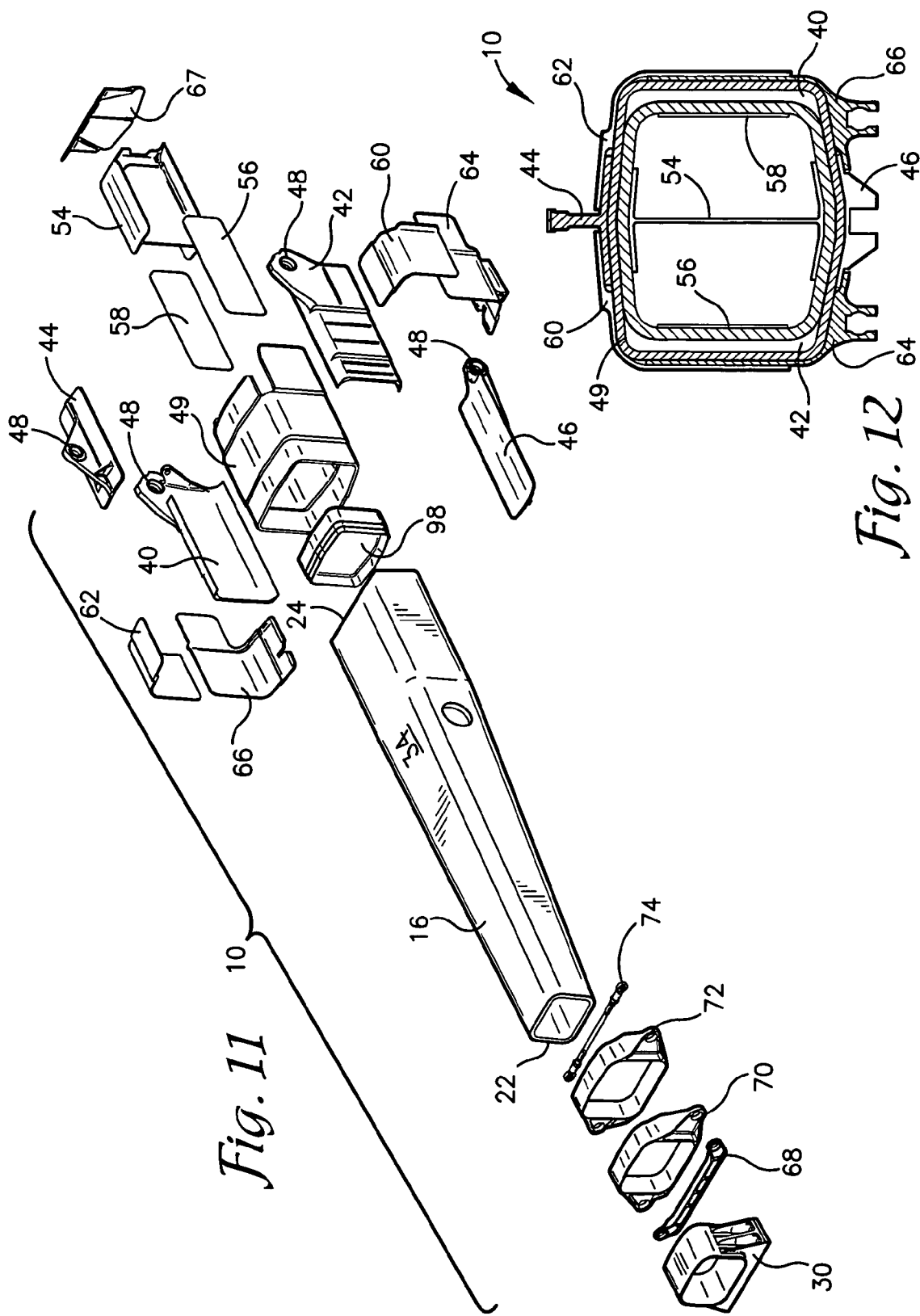

ial", Ser. No. 61/031,883, filed Feb. 27, 2008, incorporated by reference into the present document.

ENGINE PYLON MADE FROM COMPOSITE MATERIAL

RELATED APPLICATION

The present application is a nonprovisional patent application and claims priority benefit, with regard to all common subject matter, of earlier-filed U.S. provisional patent application titled, "Engine Pylon Made From Composite Material", Ser. No. 61/031,883, filed Feb. 27, 2008, incorporated by reference into the present document.

BACKGROUND

1. Field

The present invention relates to structural aircraft parts. More particularly, the present invention relates to a load-bearing structure, such as a pylon or a strut, for supporting an aircraft engine on an airframe structure of an aircraft.

2. Related Art

A pylon (or strut) that attaches a high-bypass engine to the wing of a commercial airliner is a complex structure that is very highly loaded and performs a multitude of functions such as supporting the engine weight, the fairings and systems, providing a fire and vapor barrier between the engine and the wing, transmitting the engine thrust into the structure of the airplane, and supporting the engine nacelle and thrust reverser in the optimum aerodynamic location.

The pylon must be lightweight and as small as possible to avoid exacting a large aerodynamic penalty. A typical pylon is usually composed of twenty-five or more major parts. These parts often require shims in order to be assembled and are held together by hundreds or even thousands of fasteners. Additionally, extensive corrosion protection and sealing of joints and fasteners are required. The cost of such units is a considerate portion of the total airplane price, despite the structure being a relatively small fraction of the airplane's total mass. The aircraft industry has struggled to reduce the cost of this assembly while maintaining the highly redundant structure that assures this critical component will not fail despite its being located in an environment of high loading, high sonic fatigue, high temperatures, and corrosive gasses.

The primary load carrying elements of current pylons, used to support large fan engines under the wings of commercial airplanes, have been composed of multiple metal pieces held together with mechanical fasteners. Typically this assembly consists of a semi-monocoque structure where the loads are carried in chords and webs supported by frames and bulkheads. Many of these components are made from titanium or corrosion-resistant steel in order to withstand high temperatures and a severe fatigue spectrum. The use of these materials, instead of aluminum, raises the cost, both in the fabrication of the parts and in the assembly stage, where hundreds of holes must be drilled through these very tough materials. Further, the use of mechanical fasteners requires considerable overlapping of the joining surfaces which adds weight and cost.

A more efficient process for creating such highly loaded structure would be to produce it in a manner that would significantly reduce the part count, eliminate inefficient load paths and part to part overlaps, and drastically reduce fastener usage. In the past, the technology did not exist to produce a structure of this size, complexity and strength by any means except as described in the paragraphs above.

However, increasingly, the material of choice in aerospace application is some form of composite, usually composed of graphite in an epoxy matrix. This lighter weight material is enabling designers to reduce the weight of aircraft while, at the same time, keeping costs down due to lower assembly times and less dependence on costly metals, such as titanium, where the basic raw material costs are rising rapidly with demand outpacing supply. Composites have long been used in the propulsion installation that supports the large fan engines used on current airlines, but that usage has been largely limited to the nacelle, where the major loads have been "hoop tension" loads that the composites are ideally suited to accommodate, or in the fairings covering the pylon, where the loads are relatively small. There has been no application of these materials into the actual torque box structure of the pylon where the reversible loads and highly concentrated loads at the input points often favor the use of metals.

The pylon is a prime example of "primary structure" which is a term used to refer to those portions of the aircraft that cannot be allowed to fail without putting the entire airplane in danger of being lost. It is important then that this structure is inherently fail-safe. This means that the structure must be designed to continue to function as intended despite any reasonable damage and it must continue to function through the years despite a very harsh fatigue spectrum. Composite materials, due to their inherent nature, are ideal for such applications, but composites have not been used in this application before because they do not react well to high bearing stresses, and numerous points on the pylon are subject to just that type of loading.

Accordingly, there is a need for an improved load bearing structure for supporting the engine of an aircraft that does not suffer from the problems and limitations of the prior art.

SUMMARY

The present invention provides an improved load-bearing structure, such as a pylon or strut, composed of composite material and metal fittings for supporting an engine on an airframe structure of an aircraft, such as a wing of the aircraft. The load-bearing structure design allows it to bear the load of the engine without requiring that the concentrated input loads bear up directly on the composite structure. This concept differs from many composite structural elements in that few mechanical fasteners are required. Most of the parts are integrated into the final product through bonding. The load-bearing structure is primarily composed of composite material with metal fittings used to carry the high bearing loads that are transmitted into the pylon at the engine-pylon and wing-pylon interfaces.

The load bearing structure for attaching the engine to the airframe structure of an aircraft comprises a first central structure of a monolithic tubular shape composed of composite material and a plurality of fittings operable to attach the first central structure to the airframe structure and to attach the first central structure to the engine. In various embodiments of the invention, the load-bearing structure may also comprise a second central structure of a monolithic tubular shape composed of composite material and integrated with one end of the first central structure by bonding and/or mechanical fastening means.

The fittings may be composed of metal or any material known in the art, such as corrosion resistant steel (CRES), titanium, aluminum, nickel alloy, metal matrix composites, differing alloys, or hybrid fabricated materials such as fiber laminated metals (e.g. GLARE, TIGR, etc.). Furthermore, the volume inside the first central structure and the second central structure may increase gradually from a first end to a second end of the first central structure or the second central structure. At least a portion of the fittings may be integrated with the central structures via bonding. The fittings may be bonded to the central structures by applying additional layers of composite over various metal fittings to consolidate them into the load-bearing structure. Then another cure cycle may bond the fittings to at least one of the composite central structures.

The fittings may comprise a forward mount integrated with the first end of the first central structure and an aft mount assembly integrated with the second end of the first central structure. The forward mount may connect the first central structure to the engine. The aft mount assembly may connect the first central structure to the airframe structure and to the engine and may be integrated with the first central structure in a variety of configurations disclosed herein. In other various embodiments of the invention, the first central structure is integrated with the second central structure to form the load-bearing structure.

These and other important aspects of the present invention are described more fully in the detailed description below.

BRIEF DESCRIPTION OF THE DRAWINGS

An embodiment of the present invention is described in detail below with reference to the attached drawing figures, wherein:

FIG. 11 is an exploded isometric view of the load-bearing structure of FIG. 10, further comprising an internal support assembly and wing fitting backers;

FIG. 12 is a cross-sectional view of the aft end of the load-bearing structure of FIG. 10;

DETAILED DESCRIPTION

Figure 1:
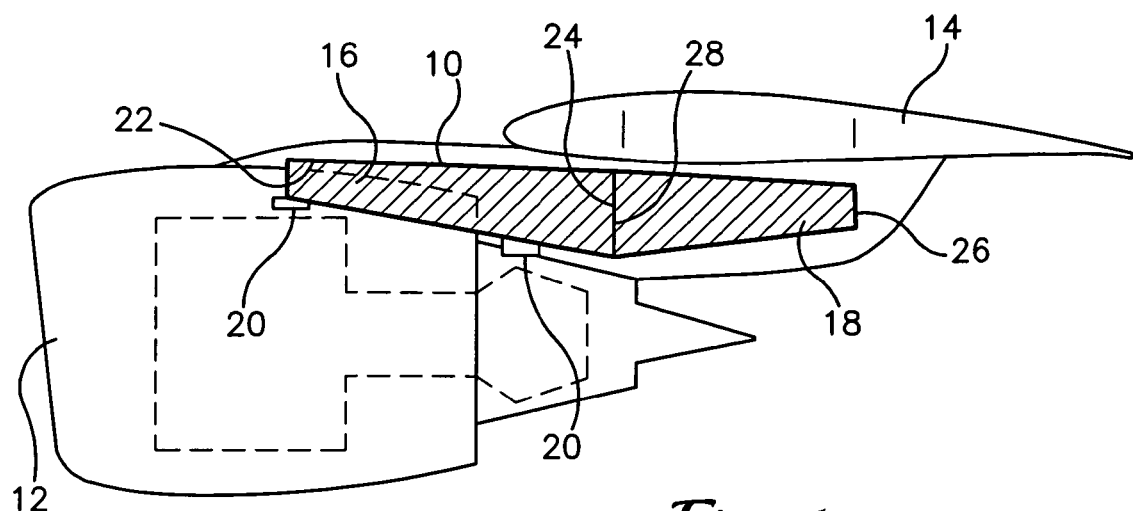
FIG. 1 is a side view of a load-bearing structure, constructed in accordance with an embodiment of the present invention, wherein the load-bearing structure attaches an engine to a wing of an aircraft and the load-bearing structure comprises two central composite structures, a portion of which slopes toward the engine.

FIG. 1 illustrates a load-bearing structure 10, such as an aircraft pylon or a strut, constructed in accordance with an embodiment of the present invention. The load-bearing structure 10 may be used for supporting an engine 12 on an airframe structure of an aircraft, such as a wing 14 of the aircraft. Referring to FIG. 1, the load-bearing structure 10 comprises at least one of a first central structure 16 and a second central structure 18, both composed of composite material, and a plurality of fittings 20 operable to attach at least one of the first and second central structures 16,18 to the wing 14 and to attach at least one of the central structures 16,18 to the engine 12.

The first and second central structures 16,18 may be monolithic, substantially elongated tubular structures. As referenced herein, tubular refers to a substantially hollow body of any cross-sectional shape. The cross-section of the tubular central structures 16,18, as viewed from either end of the tubular central structures 16,18, may be any shape which allows for a composite tow-placement machine to easily lay down the correct pattern of tapes to build up the desired composite laminate. For example, the cross-section of the first central structure 16 may be circular, substantially square with rounded corners, or substantially triangular. The walls of the tubular central structures 16,18 may be substantially solid. The cross-sectional shape of the central structures 16,18 may vary from one end of the tubular central structures 16,18 to the other. Furthermore, the tubular first central structure 16 may be substantially tapered at one or both of a first and a second end 22,24 of the first central structure 16. Additionally, the second central structure 18 may be substantially tapered at one or both of a first and a second end 26,28 of the second central structure 18. For example, the cross-sectional area between the walls of the tubular first central structure 16 may increase gradually from the first end 22 to the second end 24 of the first central structure 16.

Figure 2:
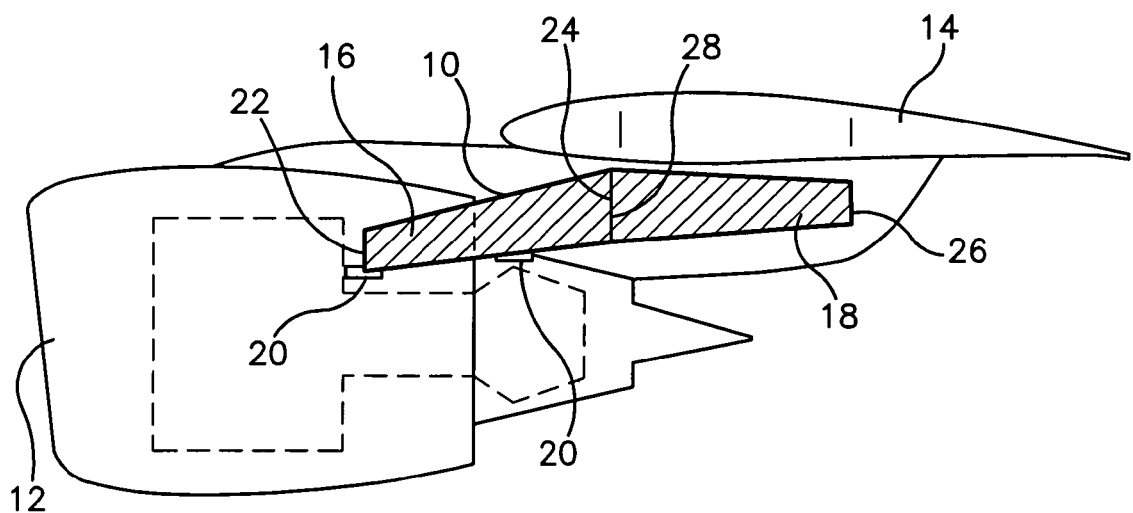
FIG. 2 is a side view of the load-bearing structure comprising two central composite structures, constructed in accordance with another embodiment of the present invention, wherein the load-bearing structure attaches the engine to the wing of an aircraft and the load-bearing structure comprises two central composite structures, a portion of which slopes toward the wing.

As illustrated in FIGS. 1-2, the second end 24 of the first central structure 16 may be integrated with the second end 28 of the second central structure 18. As further illustrated in FIGS. 1-2, the first and second central structures 16,18 may be integrated with each other such that the load-bearing structure 10 is substantially tapered at either end, the first ends 22,26 of each of the central structures 16,18. In the embodiments illustrated in FIGS. 1-2, the engine 12 is supported below and forward of the wing 14. In FIG. 1, lower portions of the first and second central structures 16,18 slope downward toward the engine 12 and toward the second ends 24,28 of the central structures 16,18. In FIG. 2, an upper portion of the central structures 16,18 slopes upward toward the wing 14 and toward the second ends 24,28 of the central structures 16,18.

Figure 3:
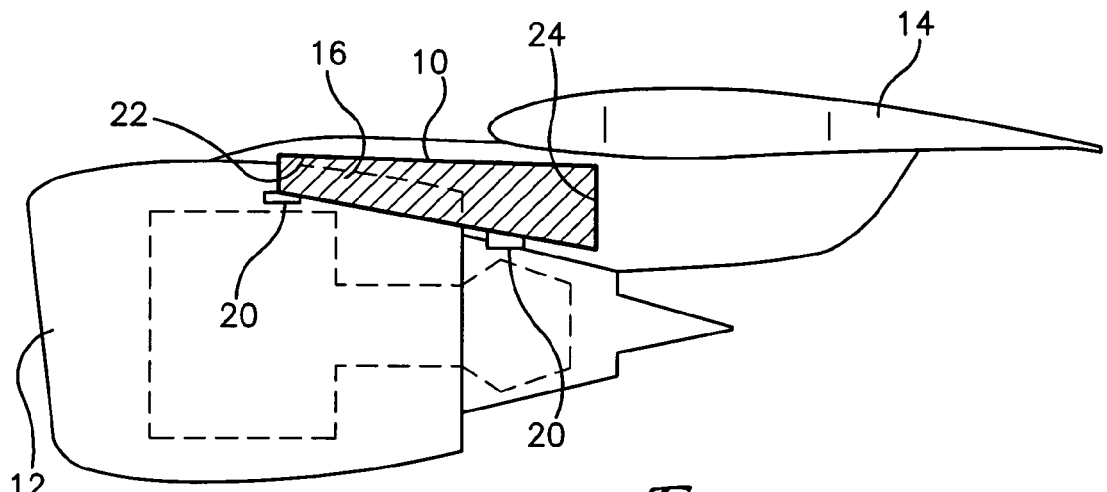
FIG. 3 is a side view of the load-bearing structure of FIG. 1 having only one central composite structure.
Figure 4:
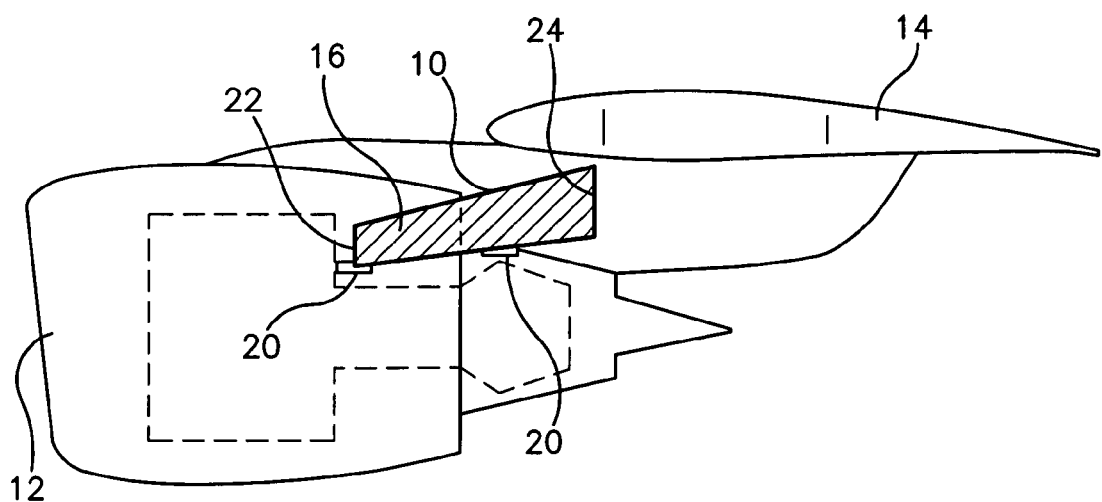
FIG. 4 is a side view of the load-bearing structure of FIG. 2 having only one central composite structure.
Figure 5:
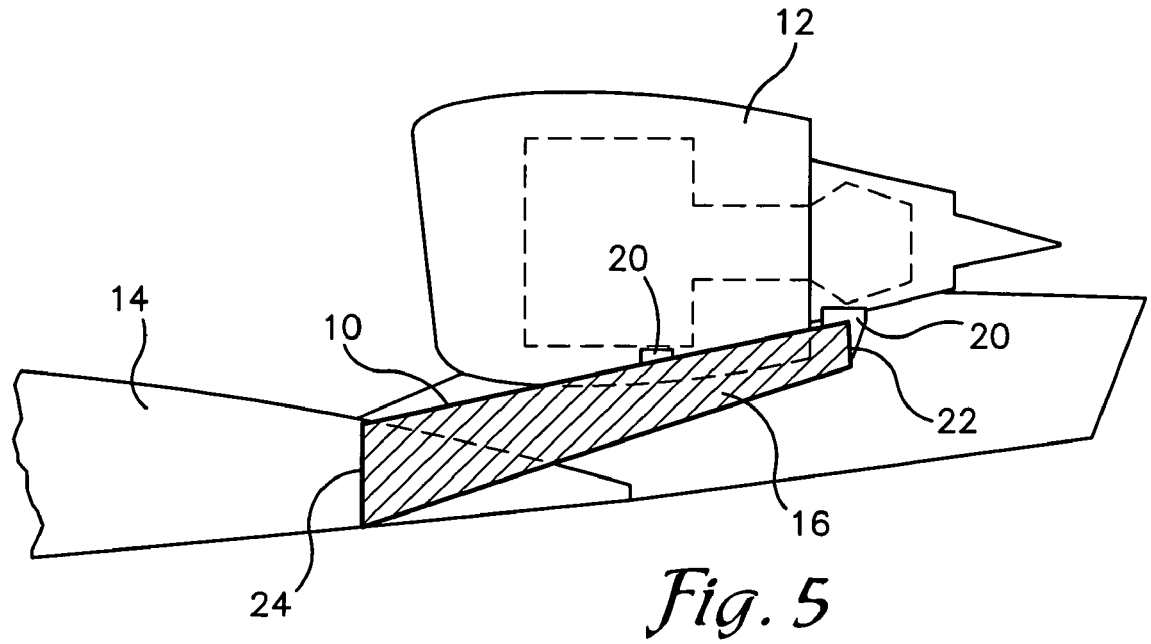
FIG. 5 is a side view of the load-bearing structure, constructed in accordance with another embodiment of the present invention, wherein the load-bearing structure attaches an engine to a wing of an aircraft and the load-bearing structure comprises one central composite structure located below the engine.
Figure 6:
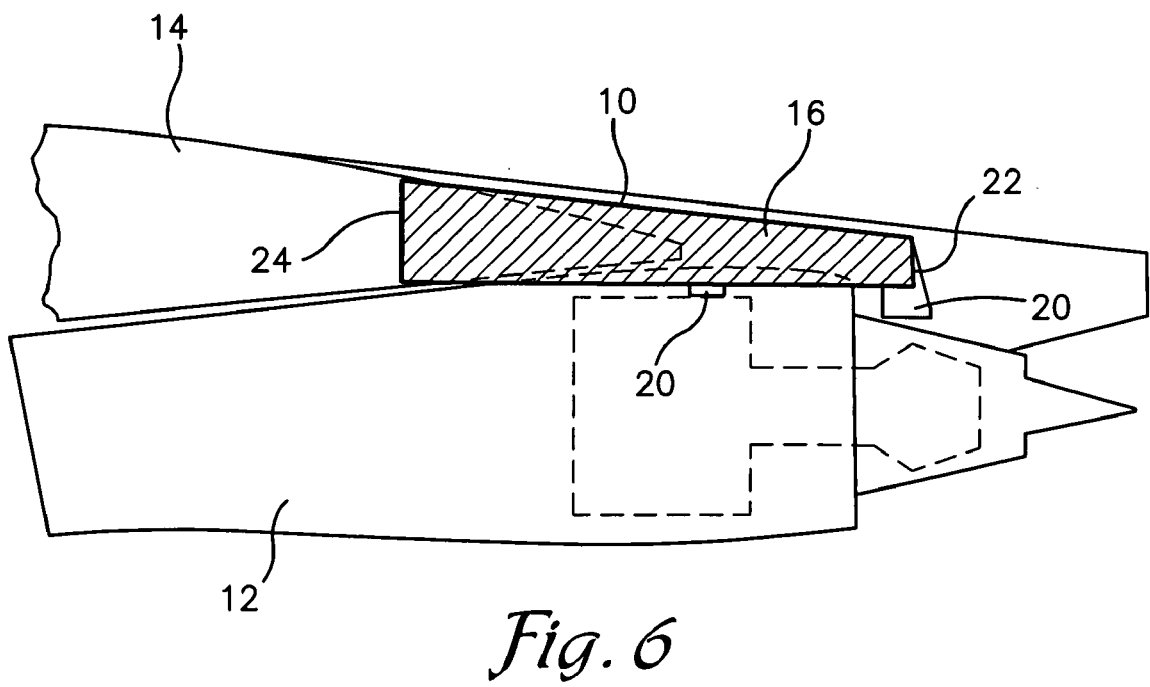
FIG. 6 is a side view of the load-bearing structure, constructed in accordance with another embodiment of the present invention, wherein the load-bearing structure attaches an engine to a wing of an aircraft and the load-bearing structure comprises one central composite structure located above the engine.

In various embodiments of the invention illustrated in FIGS. 3-4, the second central structure 18 is not used. Additionally, in other embodiments of the invention, the first central structure 16 may support the engine 12 above and aft of the wing 14, as illustrated in FIG. 5, or the first central structure 16 may support the engine 12 below and aft of the wing 14, as illustrated in FIG. 6.

The fittings 20 may be composed of any material of substantial strength to carry the high-bearing loads transmitted into the load-bearing structure 10. For example, at least some of the fittings 20 may be composed of a metal or any material known in the art, such as corrosion resistant steel (CRES), titanium, aluminum, nickel alloy, metal matrix composites, differing alloys, or hybrid fabricated materials such as fiber laminated metals (e.g. GLARE, TIGR, etc.). The fittings 20 are integrated with the load-bearing structure 10 through bonding, mechanical fasteners, or a combination of these two integration methods. Mechanical fasteners may include bolts or other mechanical fasteners known in the art.

Either pre-preg or dry fiber composite fabrication methods known in the art can be used to manufacture the load-bearing structure 10. For example, bonding the fittings 20 to the load-bearing structure 10 may be accomplished by adding layers of composite material over at least a portion of the fittings 20 to consolidate them into one or both of the first central structure 16 and the second central structure 18. Then, the load-bearing structure 10 may be cured, thereby bonding at least a portion of the plurality of fittings 20 and one or both of the first central structure 16 and the second central structure 18.

In various embodiments of the invention, such as those illustrated in FIGS. 7, 10, 13, 16, and 18, the fittings 20 may comprise a forward mount 30 for attaching the first central structure 16 to the engine 12, and an aft mount assembly 32 for attaching the first central structure 16 to one or both of the engine 12 and the wing 14.

Figure 7:
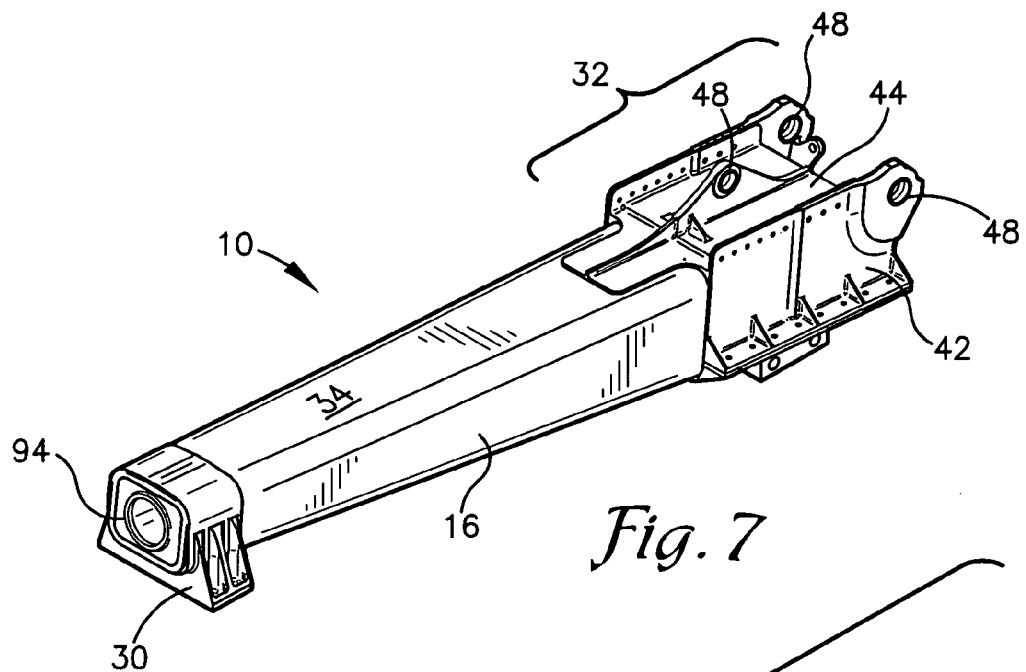
FIG. 7 is an isometric view of the load-bearing structure of FIG. 3 having a forward mount and an aft mount, the aft mount comprising side, upper, and lower fittings.
Figure 8:
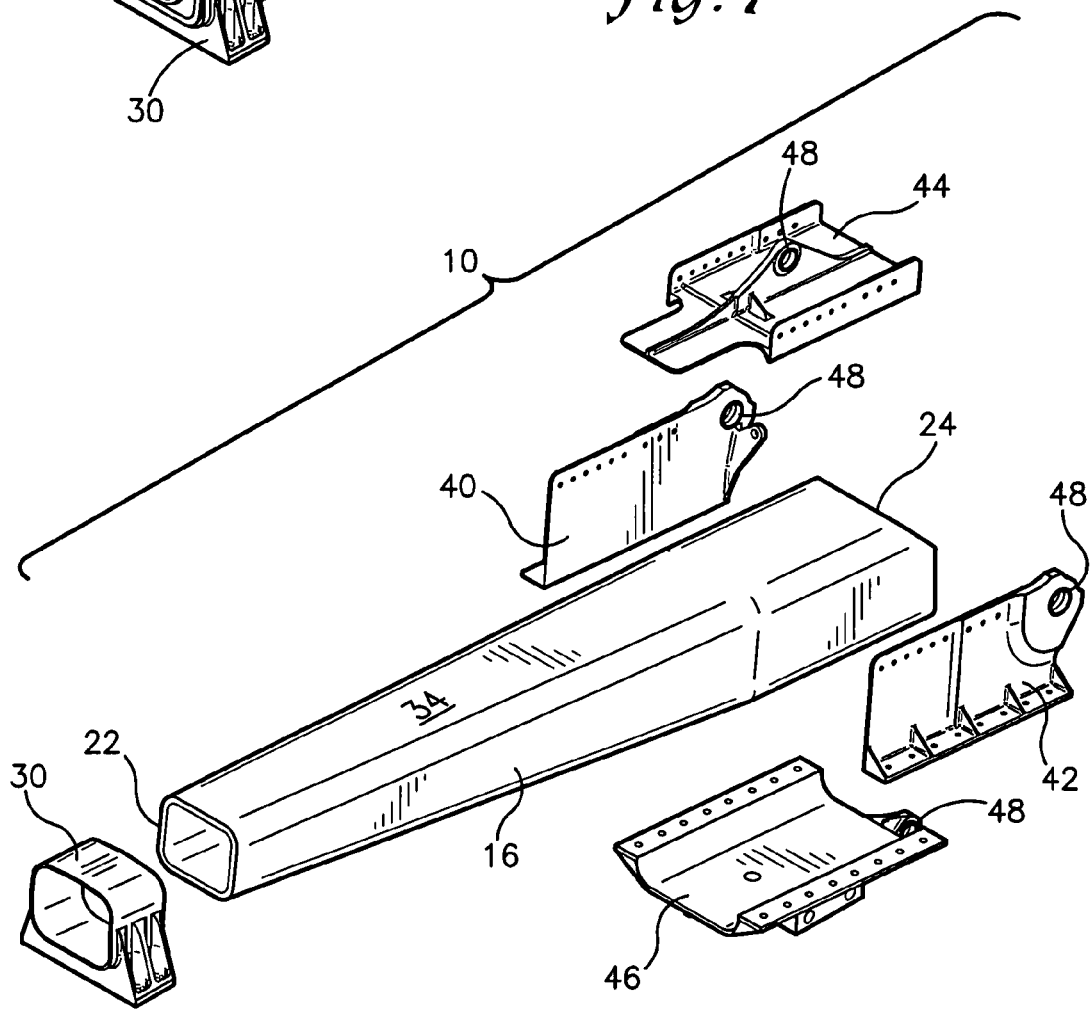
FIG. 8 is an exploded isometric view of the load-bearing structure of FIG. 7.
Figure 13:
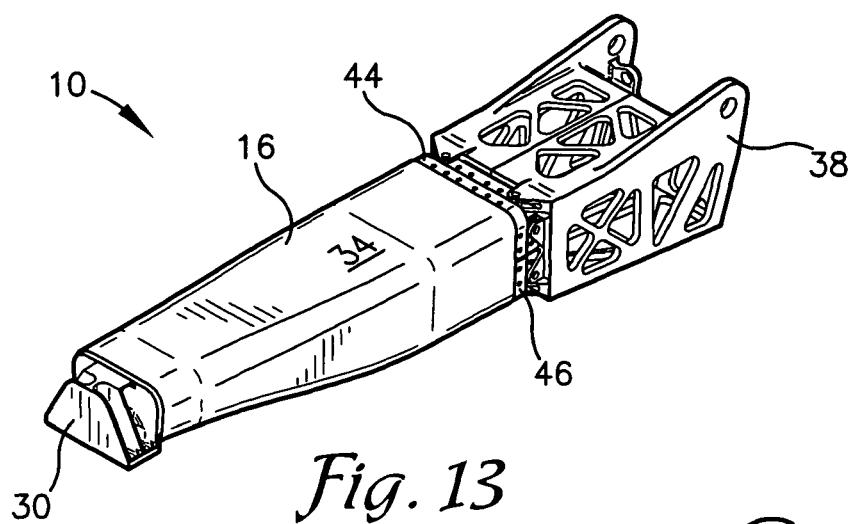
FIG. 13 is an isometric view of the load-bearing structure of FIG. 3 attached to fittings comprising side, upper, and lower fittings and a monolithic truss structure.
Figure 14:
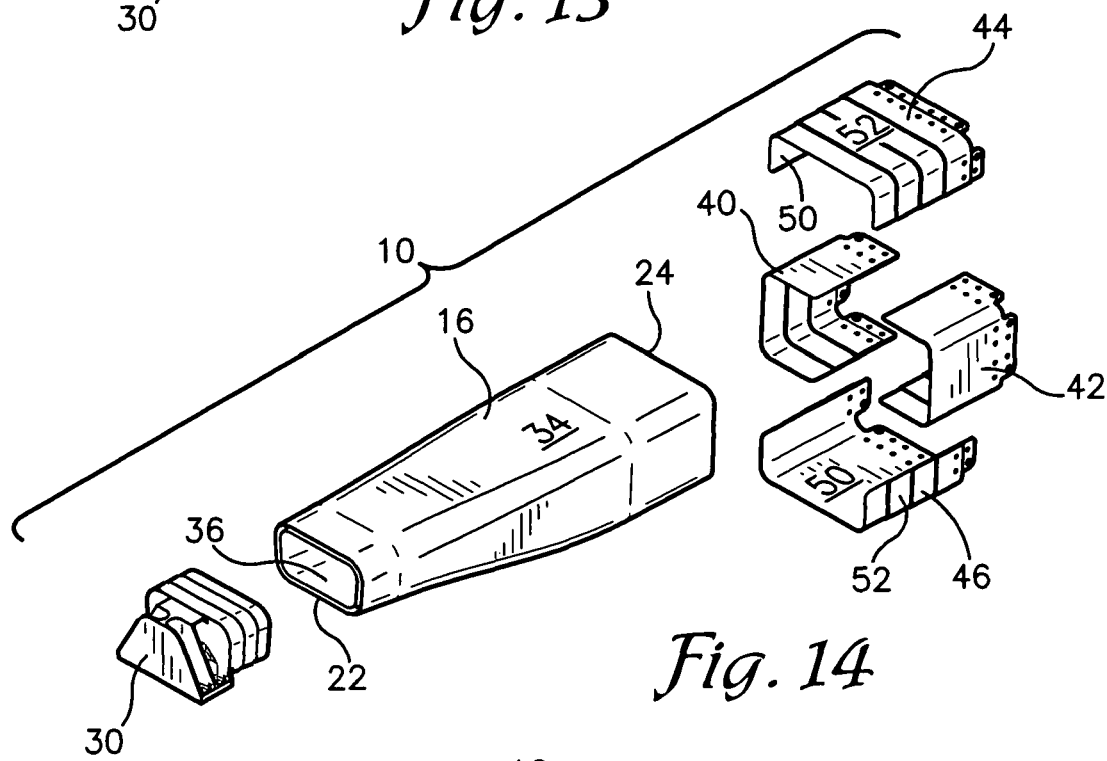
FIG. 14 is an exploded view of the load-bearing structure of FIG. 13 without the truss structure.

The forward mount 30 may be shaped to slide over the first central structure 16 such that the forward mount 30 wraps around and may be bonded to an outer surface 34 of the first central structure 16 proximate the first end 22, as is illustrated in FIGS. 7-8. Alternatively, the forward mount 30 may serve as a bulkhead, bonding to the outer surface 34 or an inner surface 36, as illustrated in FIGS. 13-14, of the first central structure 16 at the first end 22. In this configuration, a portion of the forward mount 30 extends outward of the first end 22 of the first central structure 16 for attachment to the engine 12.

In various embodiments of the invention, the aft mount assembly 32 may comprise two side fittings 40,42, an upper fitting 44, and a lower fitting 46. The side fittings 40,42 may be attached to opposing portions of the first central structure 16, while the upper fitting 44 may be attached to an upper portion of the first central structure 16 and the lower fitting 46 may be attached to a lower portion of the first central structure 16. Each of the side, upper, and lower fittings 40-46 may comprise an attachment portion 48 which extends outward from the first central structure 16 and serves as means for attaching the load-bearing structure 10 to the wing 14 and/or the engine 12. In one embodiment of the invention, illustrated in FIGS. 7-12, the side, upper, and lower fittings 40-46 are positioned outward of the first central structure 16, and are bonded to or mechanically fastened to the outer surface 34 of the first central structure 16.

Figure 10:
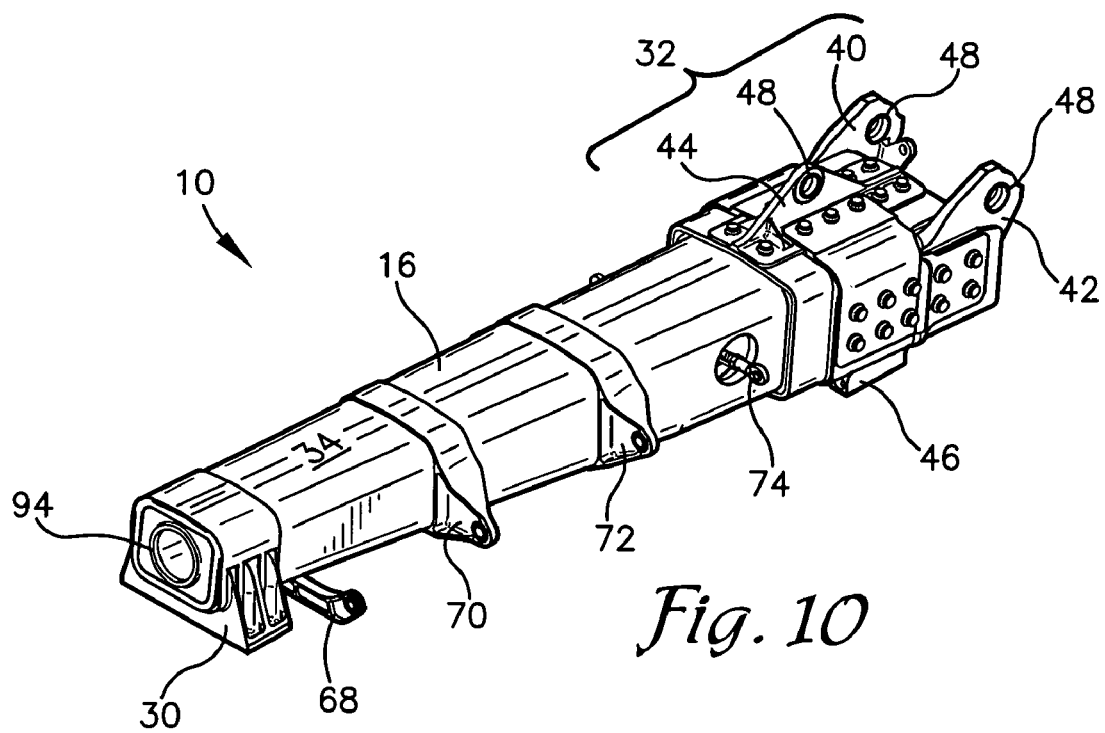
FIG. 10 is an isometric view the load-bearing structure of FIG. 3 further comprising thrust reverser unit hinge fittings, wherein the aft mount comprises side, upper, and lower fittings and aft mount straps.

For example, as illustrated in FIGS. 10-12, the side fittings 40,42 may be bonded to opposing portions of the outer surface 34 of the first central structure 16 at or proximate to the second end 24 of the first central structure 16. The upper and lower fittings 44,46 may be bonded to upper and lower portions of the outer surface 34 of the first central structure 16 at or proximate to the second end 24 of the first central structure 16. Alternatively, the upper and lower fittings 44,46 may be bonded or mechanically fastened to a composite consolidation over-wrap 49 which may consolidate the side fittings 40,42 and other various components into the load-bearing structure 10, as illustrated in FIGS. 10-12. The composite consolidation over-wrap 49 may encircle at least a portion of the aft mount assembly 32, such that components positioned between the composite consolidation over-wrap 49 and the first central structure 16 may be bonded to the first central structure 16 when the load-bearing structure 10 is cured.

Figure 15:
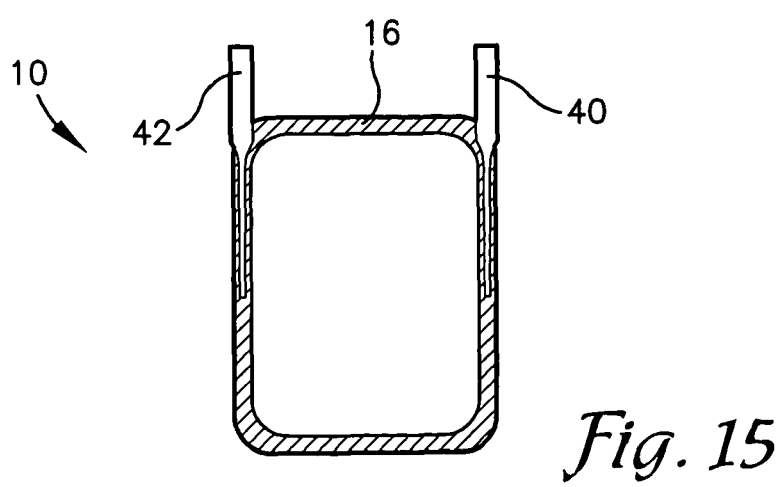
FIG. 15 is a cross-sectional view of the load-bearing structure of FIG. 3 wherein at least a portion of the fittings are inserted or imbedded into the composite central structure during the assembly of the central structure.

In another embodiment of the invention illustrated in FIGS. 13-14, the side fittings 40,42 may be positioned inward of the upper fitting 44 and the lower fitting 46, with portions of each of the side, upper, and lower fittings 40-46 overlapping another of the side, upper, and lower fittings 40-46. For example, the side fittings 40,42 may be bonded to inward-facing surfaces 50 of the upper and lower fittings 44,46, and at least a portion of outward-facing surfaces 52 of the upper and lower fittings 44,46 may be bonded to a portion of the inner surface 36 of the first central structure 16. The side, upper, and lower fittings 40-46 may also mechanically attach to a truss fitting 38 as illustrated in FIG. 13, which may then be mechanically mounted to the wing 14. In one embodiment, as illustrated in FIG. 15, at least some of the side, upper, and lower fittings 40-46 may be partially embedded within the composite first central structure 16 by either inserting the fittings during the assembly of the composite first central structure 16 or integrating the fittings as part of the fabrication of dry fiber preforms prior to resin introduction and prior to curing the structure.

As illustrated in FIGS. 10-12, the aft mount assembly 32 may further comprise an internal support assembly 54, wing fitting backers 56,58, and aft mount straps 60,62,64,66. The internal support assembly 54 may be an I-beam which extends between and is integrated with upper and lower portions of the inner surface 36 of the first central structure 16 proximate the second end 24 of the first central structure 16. The wing fitting backers 56,58 may be elongated metal plates integrated with opposing portions of the inner surface 36 of the first central structure 16 proximate the second end 24 of the first central structure 16. Both the internal support assembly 54 and the wing fitting backers 56,58 may be bonded to the inner surface 36 of the first central structure 16.

The aft mount straps 60-66, illustrated in FIGS. 10-12, are plate-like structures which may be curved to match the shape of the first central structure 16 and may be positioned outward of and attach to a portion of the consolidation over-wrap 49 and a portion of the upper and lower fittings 44,46. The aft mount straps 60-66 may be integrated into the load-bearing structure 10 by means of mechanical fasteners, as illustrated in FIG. 10. Alternatively or additionally, the aft mount straps 60-66 may be integrated into the load-bearing structure 10 by bonding means as described herein. Side portions of adjacent aft mount straps 60-66 may overlap with one another. Alternatively, the aft mount straps 60-66 may be manufactured as a single monolithic part or two monolithic parts. As illustrated in FIG. 11, a close-out panel 67 may be attached at the second end 24 of the first central component 16 to limit exposure of internal structure and surfaces to detrimental effects of the environment.

Various embodiments of the load-bearing structure 10 may also comprise thrust reverser unit hinge fittings 68,70,72,74, as illustrated in FIGS. 10-11. Thrust reverser unit hinge fittings 68-74 may be positioned along the length of the first central structure 16, spaced a distance apart relative to each other, and attached by bonding or mechanical fastening means to the first central structure 16. In some embodiments of the invention, as in FIGS. 10-11, at least some of the thrust reverser unit hinge fittings 70,72 may wrap around a portion of the first central structure 16 between the first end 22 and the second end 24. At least some of the thrust reverser hinge fittings 70,72 may be constructed of composite and co-cured (concurrently) or co-bonded (sequentially) to the central structure 16. At least one of the thrust reverser unit hinge fittings 74 may be disposed through and extend between two openings in the first central structure 16 located between the first end 22 and the second end 24. The thrust reverser unit hinge fittings 68-74 may be mechanically fastened to and support two thrust reverser halves (not shown) of the engine 12.

Figure 16:
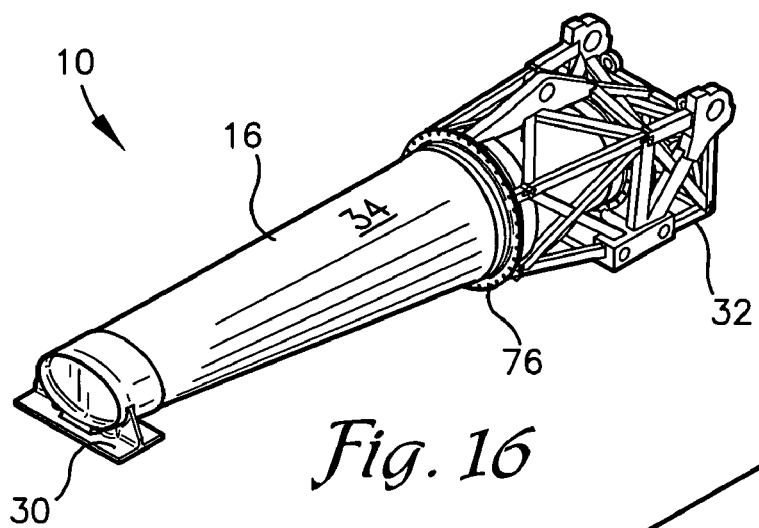
FIG. 16 is an isometric view of the load-bearing structure of FIG. 3 wherein the aft mount is a monolithic truss attached to the central structure by two attach rings.
Figure 17:
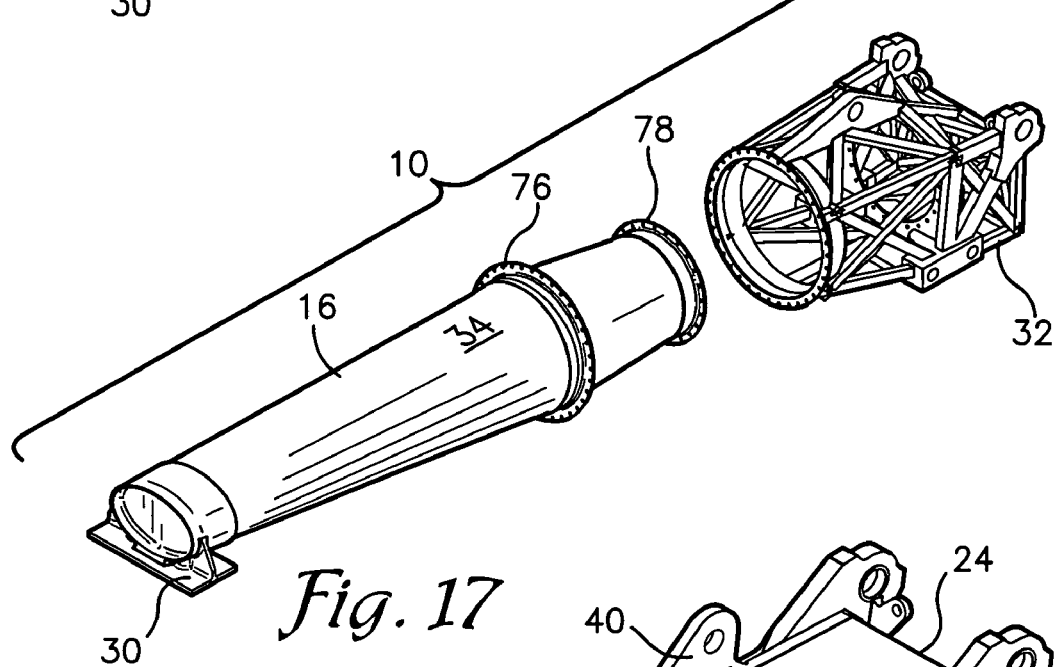
FIG. 17 is an exploded view of the load-bearing structure of FIG. 16.

In an alternative embodiment of the invention illustrated in FIGS. 16-17, the aft mount assembly 32 may be a monolithic metallic truss structure. In this embodiment of the invention, the aft mount assembly 32 may be integrated with the first central structure 16 by mechanically attaching to a forward attach ring 76 and an aft attach ring 78. The forward and aft attach rings 76,78 may slide onto the first central structure 16 and may be bonded to or mechanically fastened to the first central structure 16. While one example of joining an aft mount assembly and the first central structure 16 is discussed, other alternative methods are available for support at a forward and aft location.

Figure 18:
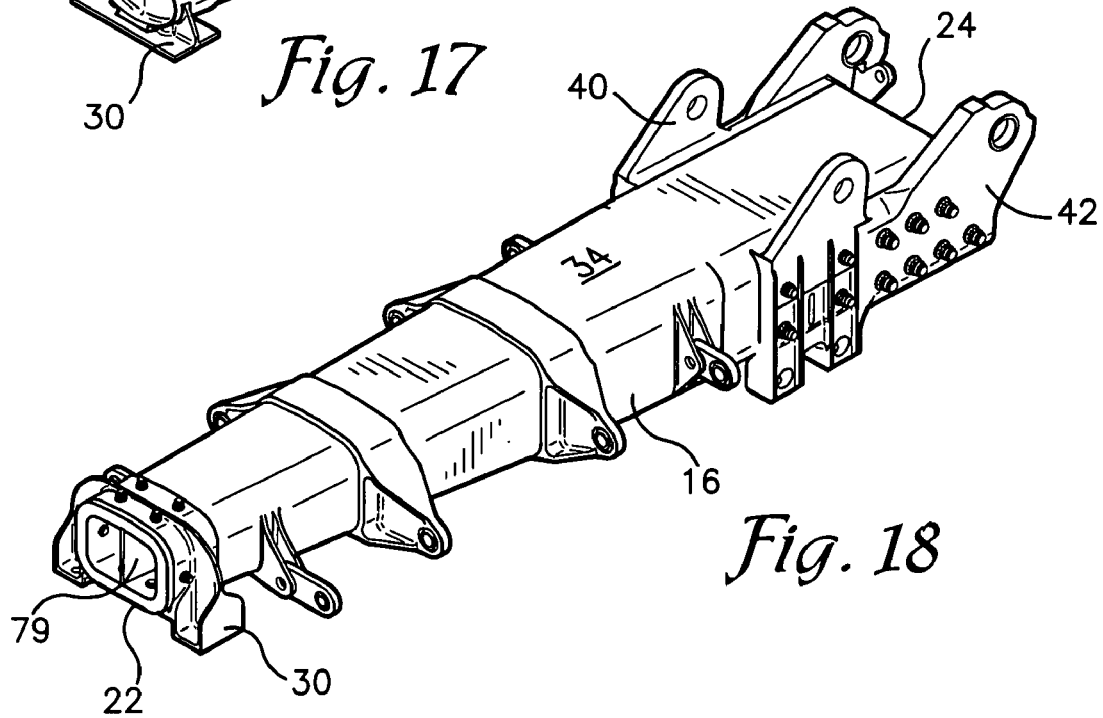
FIG. 18 is an isometric view of the load-bearing structure of FIG. 3 having an integral internal web.
Figure 19:
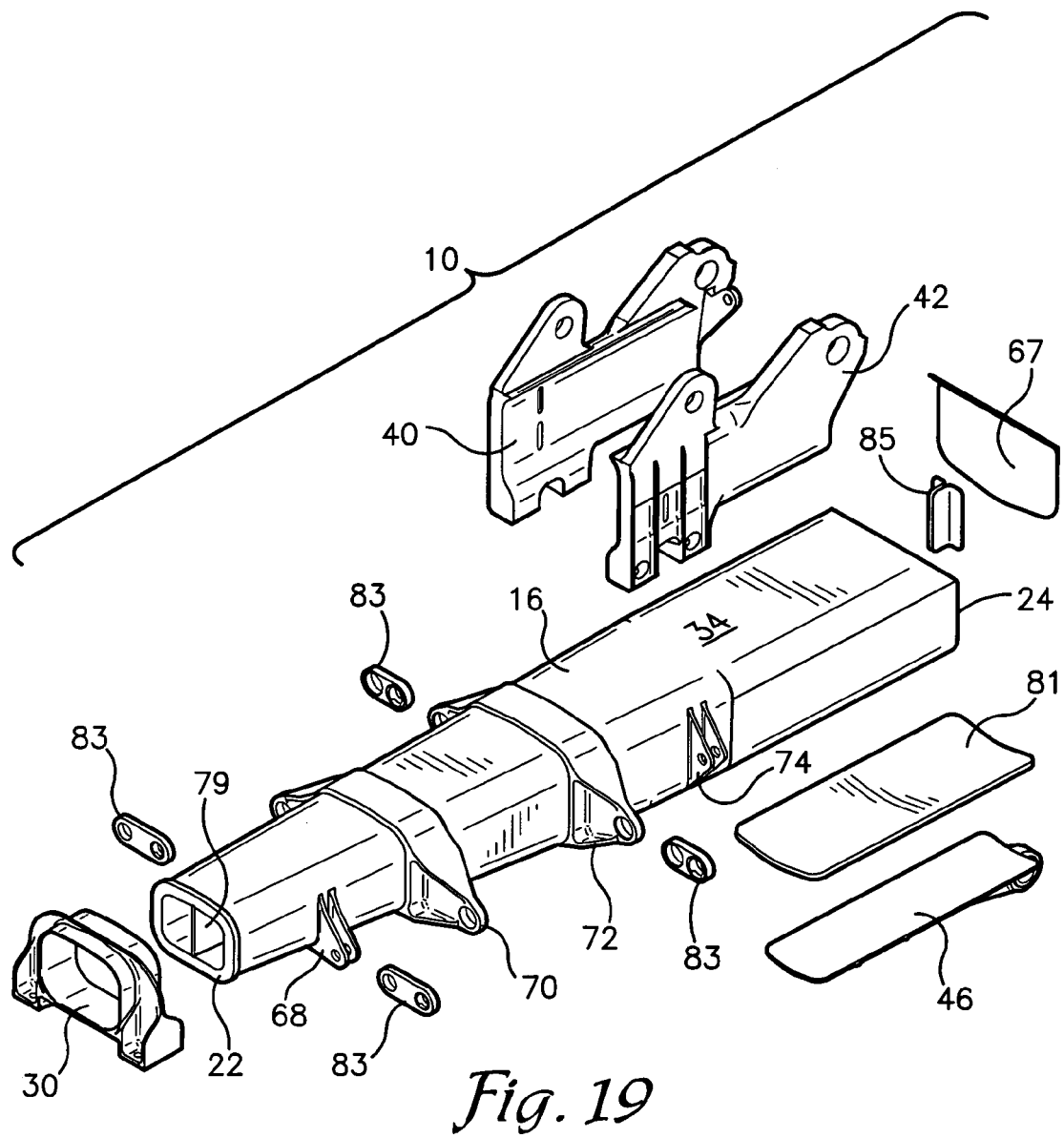
FIG. 19 is an exploded view of the load-bearing structure of FIG. 18.
Figure 20:
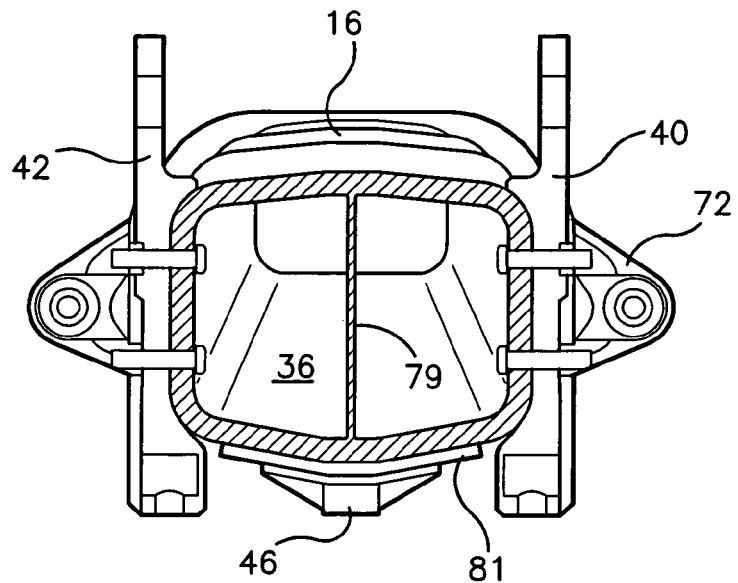
FIG. 20 is a cross-sectional end view of the load-bearing structure of FIG. 18.

Additionally, as illustrated in FIG. 18-20, the first central structure 16 may comprise at least one integral internal web 79 or I-beam for providing structural support to the first central structure 16. For example, the web 79 may extend from the first end 22 to the second end 24. In embodiments of the invention comprising the second central structure 18, both central structures 16,18 may comprise integral internal webs for providing structural support. The internal webs may be formed of composite material or any material known in the art, such as aluminum, CRES, titanium, nickel alloy, metal matrix composites, and hybrid fabricated materials.

As further illustrated in FIGS. 19-20, the structure 10 may comprise a thermal insulator 81 separating the lower fitting 46 from the first central structure 16. Alternatively, any number of thermal insulators may separate any of the fittings 20 from the first central structure 16. Additionally, the thrust reverser unit hinge fittings 68-74 may be integral with the first central structure 16 and made of composite material, being attached to an aircraft by various connectors 83. Furthermore, a close-out panel support 85 may attach the close-out panel 67 to the structure 10. Note that while side fittings 40 and 42 are illustrated here as two separate fittings, they may alternatively be formed as a single fitting, integral with each other.

Figure 21:
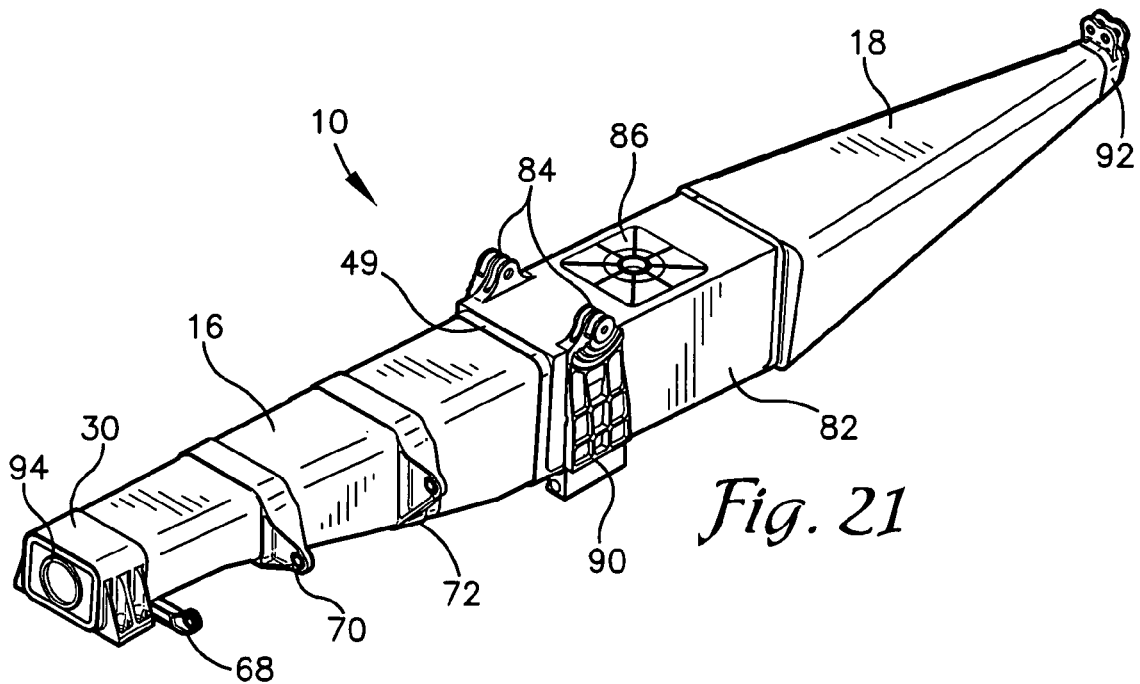
FIG. 21 is an isometric view of the load-bearing structure of FIG. 1.
Figure 22:
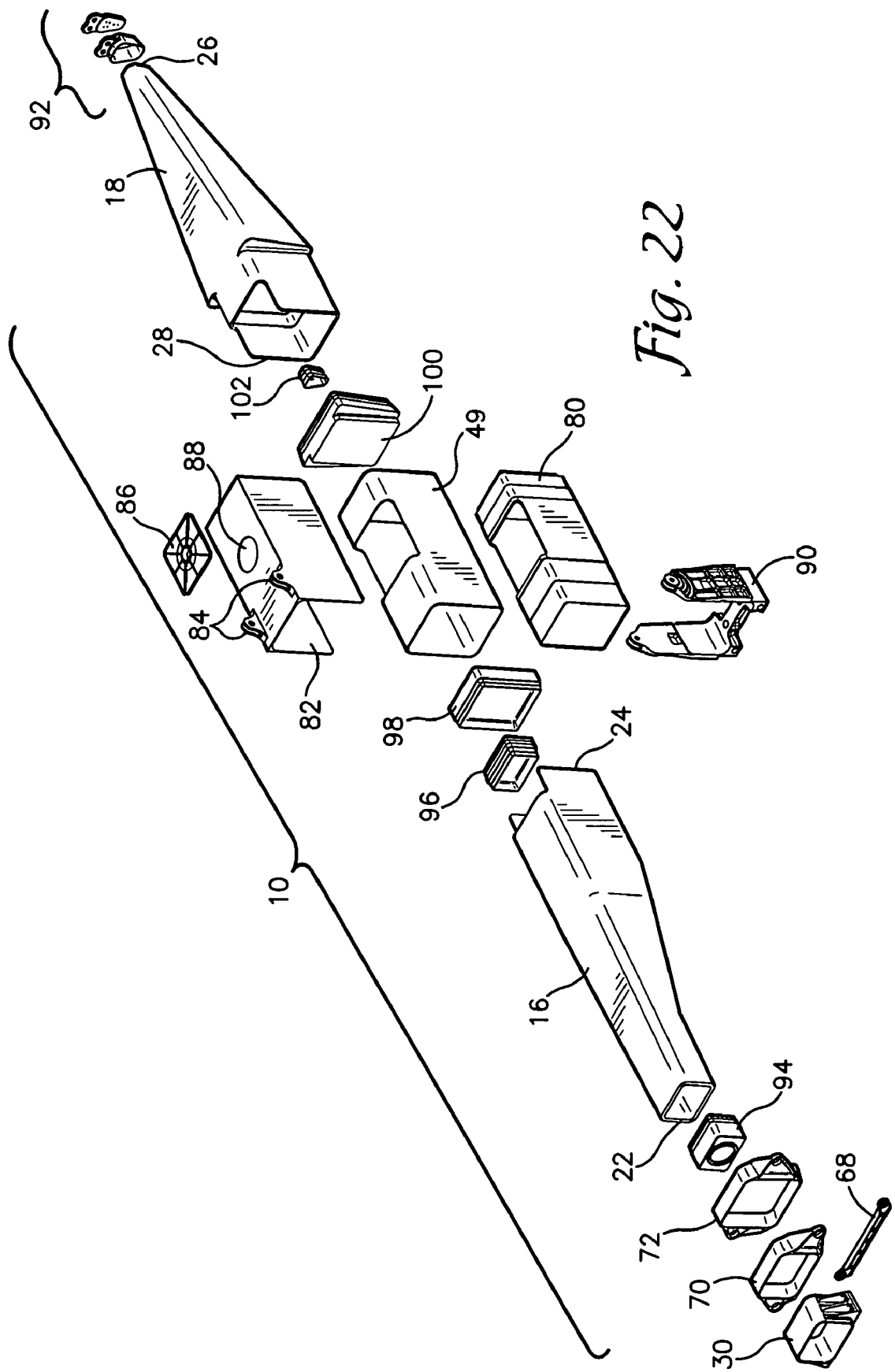
FIG. 22 is an exploded view of the load-bearing structure of FIG. 21.

In another alternative embodiment of the invention, illustrated in FIGS. 21-22, a portion of the second central structure 18, at the second end 28 of the second central structure 18, is sized to fit inside a portion of the first central structure 16, at the second end 24 of the first central structure 16. In this embodiment of the invention, the consolidation over-wrap 49 may wrap around a portion of the first central structure 16 and the second central structure 18, allowing the two structures to be bonded together when cured. Furthermore, a tube splice 80 may be integrated with and positioned inward of the consolidation over-wrap 49, and a splice fitting 82 may be integrated with and positioned outward of the consolidation over-wrap 49. The splice fitting 82 may comprise attachment provisions 84 for attaching the load-bearing structure 10 to the wing 14.

The load-bearing structure of the embodiment illustrated in FIGS. 21-22 may comprise a spigot fitting 86 integrated with an opening 88 in an upper portion of the splice fitting 82. Additionally, a mid fitting support 90 may be attached adjacent to the attachment provisions 84 of the splice fitting 82 and may further attach to the engine 12 and the wing 14. The forward mount 30 of the first central structure 16 may attach to the engine 12, while aft attachment means 92, attached at the first end 26 of the second central structure 18, may attach to the wing 14.

In various embodiments of the invention, the first central structure 16 and the second central structure 18 may also comprise bulkheads 94,96,98,100,102, which may be attached at various points within the central structures 16,18 or may be attached at one or both of the first ends 22,26 and the second ends 24,28 of the first central structure 16, as illustrated in FIGS. 11 and 22. One or more of bulkheads 94,96,98,102 may be co-cured or co-bonded with the central structures 16,18. The bulkheads 94,96 may be composed of composite material or other suitable materials, such as a metal. As illustrated in FIG. 13, at least one of the bulkheads 94,96 may be replaced with or integral to the forward mount 30, which may be bonded to the first central structure 16 and mounted to the engine 12.

Figure 9:
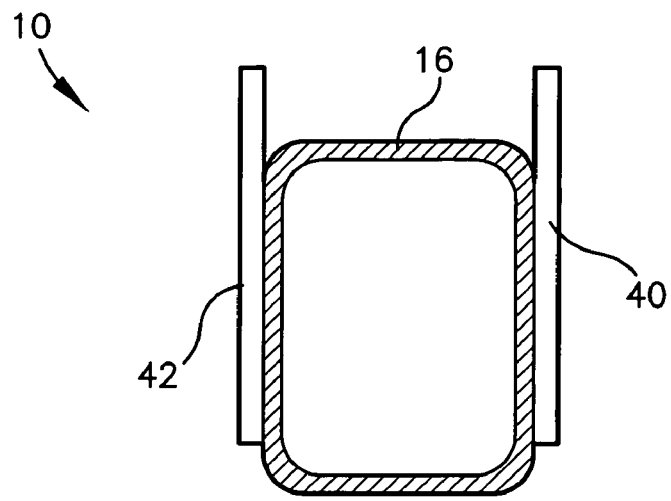
FIG. 9 is a cross-sectional view of the load-bearing structure of FIG. 7, demonstrating that the side fittings are located outward of the central structure.
Figure 23:
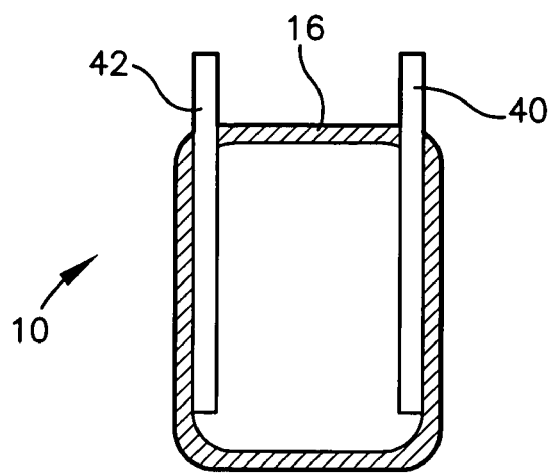
FIG. 23 is a cross-sectional view of the load-bearing structure as in any of FIGS. 1-6 wherein the fittings are primarily located internal to the central structure.

The fittings 20 of the load-bearing structure 10 have been described according to exemplary embodiments above. However, the fittings 20, which transfer load into the first and second central structures 16,18, may be integrated with the central structures 16,18 in a variety of configurations. For example, FIG. 23 illustrates the fittings 20 being primarily located internal to the central structure 16 and bonded to the inner surface 36 of the central structure 16, with at least one portion of the fittings 20 extending outward of the central structure 16 to attach to the engine 12 or the wing 14. FIG. 9 illustrates the fittings 20 positioned outward of the central structure 16. In this configuration, the fittings 20 may be bonded or mechanically fastened to the outer surface 34 of the central structure 16. FIG. 15 illustrates the fittings being embedded within the composite central structure 16.

Figure 24:
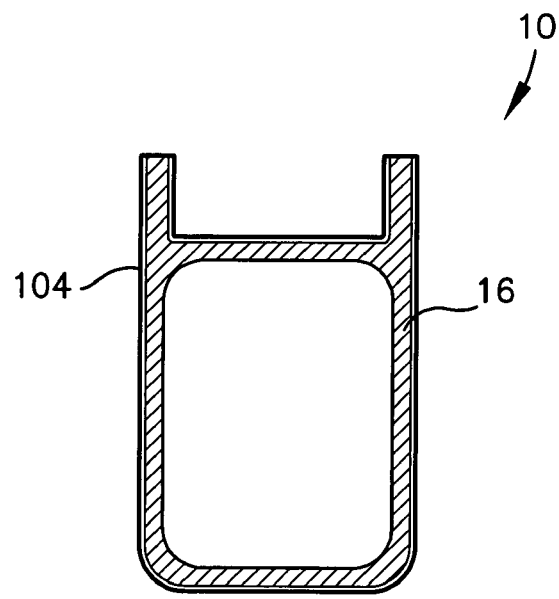
FIG. 24 is a cross-sectional view of the load-bearing structure as in any of FIGS. 1-6 wherein the central structure is at least partially covered with a reinforcing component.
Figure 25:
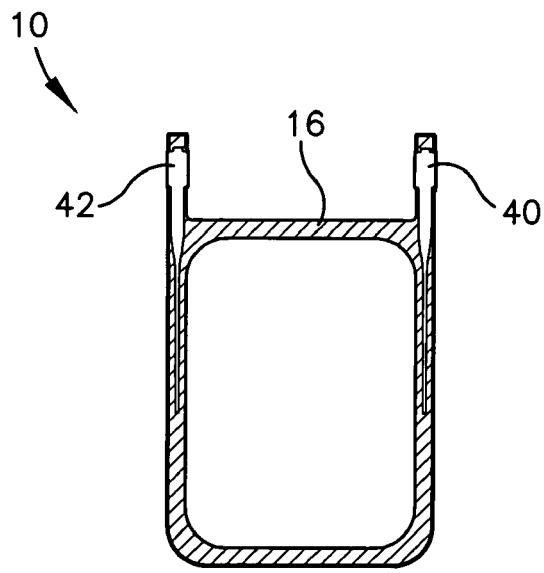
FIG. 25 is a cross-sectional view of the load-bearing structure wherein the fittings are entirely embedded into the central structure.

In one embodiment of the invention, illustrated in FIG. 24, a composite central structure 16 is partially covered with a reinforcing component 104 which may be co-cured (concurrently) or co-bonded (sequentially) to the central structure 16. Alternatively, the reinforcing component 104 may be included as part of the assembly of dry fiber pre-forms prior to resin introduction and prior to curing the structure. The reinforcing component 104 is preferably composed of titanium and may be bonded to the central structure 16 around areas of high load transfer, such as between the fittings 20 and the central structure 16 or between the thrust reverser unit hinge fittings 68,70,72,74 and the central structure 16. Alternatively, FIG. 25 illustrates the fittings being entirely embedded into the composite central structure 16, thereby strengthening a portion of the central structure 16 which directly bears load.

Although the invention has been described with reference to the embodiments illustrated in the attached drawings, it is noted that equivalents may be employed and substitutions made herein without departing from the scope of the invention as recited in the claims. For instance, the wing 14 is an example of an airframe structure, but the load-bearing structure 10 may be attached to other portions of the airframe structure without departing from the scope of this invention. Also, alternatively, the load-bearing structure 10 may mount equipment other than the engine 12 to the airframe structure, as may be required in various applications.

Having thus described an embodiment of the invention, what is claimed as new and desired to be protected by Letters Patent includes the following:

The invention claimed is:

1. A load-bearing structure for attaching an engine to an airframe structure of an aircraft, the load-bearing structure comprising:
   a monolithic, hollow, tubular first central structure having a substantially solid, non-lattice or non-truss configuration, formed of composite material and having a first end and a second end; and
   a plurality of fittings attaching the first central structure to the airframe structure and attaching the first central structure to the engine.

2. The load-bearing structure of claim 1, wherein the fittings are composed of metal.

3. The load-bearing structure of claim 1, wherein the fittings are composed of at least one of aluminum, CRES, titanium, nickel alloy, metal matrix composites, and hybrid fabricated materials.

4. The load-bearing structure of claim 1, wherein the first central structure substantially tapers from the second end to the first end of the first central structure.

5. The load-bearing structure of claim 1, wherein at least a portion of the fittings are integrated with the first central structure by bonding.

6. The load-bearing structure of claim 1, wherein the fittings are bonded to the first central structure by layers of composite material.

7. The load-bearing structure of claim 1, wherein the fittings are at least one of externally bonded, internally bonded, embedded within, and integral to the first central structure.

8. The load-bearing structure of claim 1, wherein the fittings comprise:
   a forward mount integrated with the first central structure, proximate the first end of the first central structure, for connecting the first central structure to the engine; and
   an aft mount assembly integrated with the first central structure, proximate the second end of the first central structure, for connecting the first central structure to the engine and to the airframe structure.

9. The load-bearing structure of claim 8, wherein the aft mount assembly comprises:
   two side fittings attached to opposing portions of the first central structure;
   a lower fitting attached to a lower portion of the first central structure; and
   an upper fitting attached to an upper portion of the first central structure, wherein the side, upper, and lower fittings are at least one of bonded and mechanically attached to the first central structure and mechanically attached to at least one of the engine and the airframe structure.

10. The load-bearing structure of claim 9, wherein the side fittings are integrated with the upper and lower fittings, and the upper and lower fittings are integrated with a portion of the inner surface of the first central structure.

11. The load-bearing structure of claim 9, wherein at least a portion of the plurality of fittings of the aft mount assembly are integrated into the load-bearing structure by a composite consolidation over-wrap which extends around at least a portion of the aft mount assembly and the first central structure.

12. The load-bearing structure of claim 9, wherein the aft mount assembly comprises a plurality of wing backers integrated with opposing portions of the inner surface of the first central structure.

13. The load-bearing structure of claim 8, wherein the aft mount assembly comprises an internal support assembly extending between and integrated with upper and lower portions of the inner surface of the first central structure.

14. The load-bearing structure of claim 8, wherein the aft mount assembly is a monolithic truss structure.

15. The load-bearing structure of claim 1, further comprising at least one thrust reverser unit fitting attached to the first central structure between the first and second end of the first central structure for attaching to two thrust reverse halves of the engine.

16. The load-bearing structure of claim 1, further comprising at least one close-out panel which limits exposure of internal structure to environmental effects, wherein the close-out panel is integrated with the first central structure at the second end of the first central structure.

17. The load-bearing structure of claim 1, further comprising:
   a second central structure of a tubular shape, wherein the second central structure is composed of composite material and a portion of the second central structure is sized to fit inside a portion of the first central structure; and
   a composite consolidation over-wrap for bonding the two central components together.

18. The load-bearing structure of claim 1, wherein the load-bearing structure is one of a pylon and a strut.

19. The load-bearing structure of claim 1, wherein the tubular first central structure may have a cross-section that is one of circular, substantially square, and substantially triangular.

20. The load-bearing structure of claim 1, wherein the walls of the tubular first central structure are substantially solid.

21. The load-bearing structure of claim 1, wherein the tubular first central structure may have at least one integral internal web for providing structural support to the load-bearing structure.

22. The load-bearing structure of claim 1, wherein a thermal insulator separates at least one of the fittings from contacting the tubular first central structure.

23. A load-bearing structure for attaching an engine to a wing of an aircraft, the load-bearing structure comprising:
   a monolithic, tubular first central structure formed of composite material and having a first end and a second end;
   at least one bulkhead formed of composite material and bonded to inner walls of the first central structure;

a metal forward mount bonded to the first central structure by layers of composite material and mechanically fastened to at least one of the wing and the engine;

two side fittings bonded by layers of composite material to opposing portions of the first central structure and having portions for mechanically attaching to the wing;

a lower fitting bonded by layers of composite material to a lower portion of the first central structure and having portions for mechanically attaching to at least one of the wing and the engine;

an upper fitting bonded by layers of composite material to an upper portion of the first central structure and having portions for mechanically attaching to the wing;

an I-beam extending between and integrated with upper and lower portions of the inner surface of the first central structure; and a close-out panel integrated with the first central structure at the second end of the first central structure for limiting exposure of internal structure to environmental effects.

24. A load-bearing structure for attaching an engine to a wing of an aircraft, the load-bearing structure comprising:

a monolithic, tubular first central structure formed of composite material and having a first end and a second end;

a metal forward mount bonded to the first central structure by layers of composite material and mechanically fastened to at least one of the wing and the engine;

a monolithic, tubular second central structure formed of composite material having a first end and a second end, wherein a portion of the second central structure is sized to fit inside and be integrated with a portion of the first central structure by at least one of bonding and mechanical fastening means;

at least one bulkhead formed of composite material and bonded to inner surfaces of at least one of the first central structure and the second central structure;

a plurality of central fitting components bonded to both the first central structure proximate the second end of the first central structure and the second central structure proximate the second end of the second central structure by layers of composite material, thereby bonding the second end of the first central structure to the second end of the second central structure; and an aft attachment fitting bonded to the first end of the second central structure for attaching the second central structure to the wing.

* * * * *